United States Patent Office 3,462,739
Patented Aug. 19, 1969

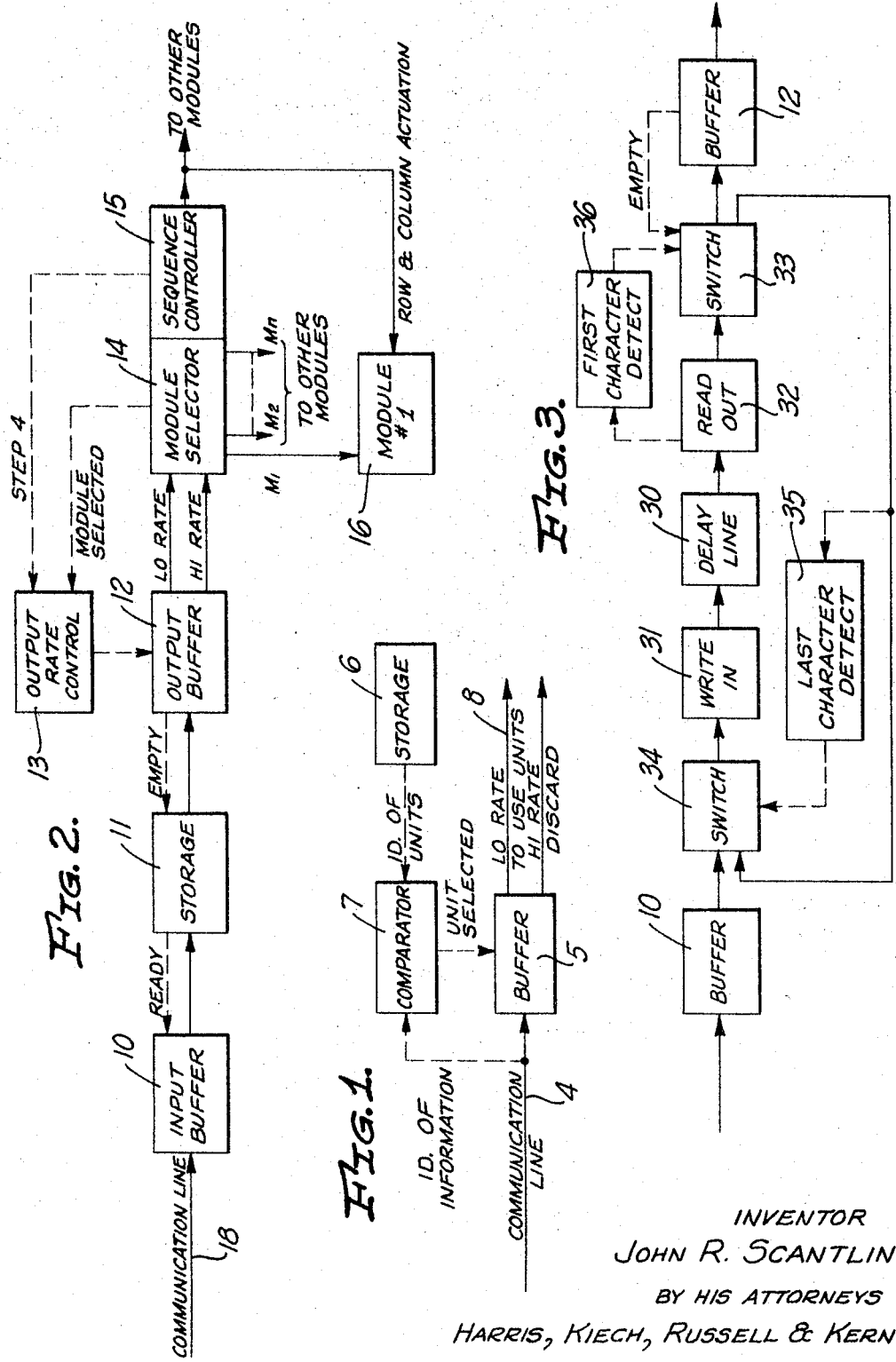

3,462,739
VARIABLE RATE SYSTEM FOR HANDLING SECURITY PRICE INFORMATION
John R. Scantlin, Los Angeles, Calif., assignor to Scantlin Electronics, Inc., Los Angeles, Calif., a corporation of Delaware
Filed Mar. 14, 1966, Ser. No. 533,983
Int. Cl. H04q 5/00
U.S. Cl. 340—154                    11 Claims

ABSTRACT OF THE DISCLOSURE

Apparatus for use with a stock price display board or the like and providing for data transmission rates higher than can be handled by the board for display. Apparatus for screening incoming data at a high rate, rejecting or diverting unwanted items, and transmitting wanted items onward at a lower rate to the board for display.

---

This invention relates to systems for handling security price information or the like and, in particular, to a new and improved system for handling information from an information source which provides the information at a rate higher than it can be handled by utilization units for which the information is intended. The invention will be described herein as adapted for use with a stock price display board but it is realized that other applications of the system can be made.

The typical source of information for a stock price display board is a communication line originating in New York City. The source will provide information on stocks traded on an exchange or exchanges including previous close, open, high, low and last prices. A typical message may comprise seven characters such as AMOL274. The first three characters comprise the identification portion and are the code letters of a particular stock. The last four characters comprise the data portion of the message, with the four character being the price identification character and the last three characters being the value or number. In the example given above, the message indicates that the last price (L) for AMO was 27⅜. A typical display board will have a plurality of modules as the utilization units for displaying this information, with a module for each of the stocks of interest to the particular customer. A typical display board is described in the copending application of Howard W. Beckwith entitled "Display Board" Ser. No. 219,260, filed Aug. 24, 1962, now Patent No. 3,266,019, and assigned to the same assignee as is the present application. A suitable module selector and a suitable sequence controller for utilizing the messages from the source to actuate the display board are described in the copending applications of James R. Francy entitled "Selector for Display Board" Ser. No. 345,326, filed Feb. 17, 1964, now Patent No. 3,317,686 and Thomas R. Blakeslee et al. entitled "Controller for Display Board" Ser. No. 346,229, filed Feb. 20, 1964, now Patent No. 3,297,927, both assigned to the same assignee as is the present application.

All the messages comprising the stock price data from the source are directed to the module selector. The module selector actuates the particular module on the display board corresponding to the stock of the message being handled. The setting of the module is then changed as called for by the data portion of the message. If on the board in question, there is no module corresponding to the stock of the message in question, the information is discarded. The setting of the display module is basically a mechanical operation and is the slowest step in the overall information handling system and has placed a limit on the rate at which messages can be transmitted from the source on the communication line. However, it is relatively easy to transmit messages from the source at higher rates and it is an object of the present invention to provide a new and improved information handling system for positioning between the source and the utilization modules to permit transmission from the source at a rate higher than the information can be handled by the utilization units. In one specific embodiment of the invention, the transmission rate on the communication line from the source has been doubled without any change in speed of operation of individual modules.

It is an object of the invention to provide a system for handling information and including means for receiving a message at a first rate and storing the message, means for analyzing the message to determine if it corresponds to one of the utilization units supplied by the system, and means for transmitting at least a portion of the message from storage at a lower rate when there is correspondence and at a higher rate when there is not correspondence.

It is an object of the invention to provide a system which can receive high speed information from the source, store the information and analyze it to determine if the information is to be used to set a module on a display board, and then to shift the information to the selected stock module at a lower speed which will allow the module to function properly. At the same time, all information determined not to be of use will be unloaded or discarded at a much faster rate. A further object is to provide such a system which incorporates means for storing a large number of messages as received from the source, while permitting the board controller to read every message, decide if the stock of the message is on the board or boards being supplied by the system, and transmit the information for a price change or unload the information, as determined by the decision. An additional object is to provide such a system incorporating a large storage memory which operates at a relatively fast rate, permitting absorption of incoming messages without loss of information and permitting unloading of information at selected rates depending upon the use to be made of the information.

It is an object of the invention to provide such a system which can use the units or modules themselves to provide indications of data to be used and which can use a separate memory to provide the identification of the units being supplied by the system.

It is an object of the invention to provide a system for handing security price information or the like between a source and a plurality of utilization units wherein the information comprises messages, each having a sequence of characters including an identification portion and a data portion, and including buffer storage means for storing a message and having means for transmitting the message from storage at a lower rate and at a higher rate, a controller for selecting a unit corresponding to the identification portion of a message, the data portion of which is in the buffer storage means, signal means for generating a selection signal when a unit is selected, and control means having the selection signal as an input for actuating the buffer storage means to transmit the data portion of the message at the lower rate. A further object is to provide such a system wherein the data portion of the message is transmitted from storage at a higher rate when no unit is selected. An additional object is to provide such a system wherein the higher rate data portion may be discarded or may be utilized for timing control in the controller or for other purposes.

It is an object of the invention to provide such a system wherein the identification portion of a message is transmitted from storage at the same rate as the data portion of the preceding message. Another object is to provide such a system wherein a message character after the identification portion of the message is always transmitted at a slow rate, thereby providing time for mechanical operation of relays and the like.

It is an object of the invention to provide such a system incorporating a storage unit for a plurality of messages with provision for unloading the earliest stored message for the next operation of the controller. An additional object is to provide such a system in which the plurality of messages may be stored in sequence with a first in-first out operation for maintaining order in the messages. An additional object is to provide such a system incorporating a high capacity high speed recirculating loop memory, such as a delay line, permitting message storage without information loss or excessive time delay in the over-all operation.

The invention also comprises novel combinations and arrangements of parts which will more fully appear in the course of the following description. The drawing merely shows and the description merely describes a preferred embodiment of the present invention which is given by way of illustration or example.

In the drawing:

FIG. 1 is a block diagram of a preferred form of the system of the invention;

FIG. 2 is a block diagram illustrating a form of the system of the invention as used with a stock price display; and FIG. 3 is a block diagram illustrating a preferred embodiment of the storage unit of the system of FIG. 2.

In the system of FIG. 1, the information arrives on a communication line 4 and at least the data portion thereof is directed to a buffer 5 for temporary storage. The buffer provides for transmitting information therefrom at a lower rate to the utilization units served by the system on a line 8. The buffer 5 also provides for transmitting information therefrom at a higher rate. The higher rate information may be dumped or discarded directly or may be utilized for some control or recording purpose. The identification of each of the units served by the system is maintained in a memory or storage 6 and is changed whenever the units being served by the system are changed. The identification portion of an incoming message is compared with the identification of all the units being served by the system in a comparator 7. When correspondence is found, an output or selection signal from the comparator 7 is transmitted to the buffer 5 to cause transmission of information from the buffer at the lower rate. When there is no correspondence between the identification of the message and that of the units being served by the system, lack of correspondence is indicated to the buffer and the message is disposed of at the higher rate.

The system as illustrated in FIG. 1 is particularly adapted for use where the utilization units are positioned remote from the buffer and where the units may be located in a number of different positions, while the storage or memeory 6 and the comparator 7 are adjacent the buffer 5. FIG. 2 illustrates a system in which the utilization units are modules and the associated controller also functions as the storage unit 6 and comparator 7. This arrangement is particularly adapted for installation where the controller and modules are adjacent the buffer.

The system of FIG. 2 includes an input buffer 10, a storage unit 11, an output buffer 12, and an output rate control 13. The output from the buffer 12 is directed to a controller comprising a module selector 14 and a sequence controller 15, with the controller providing actuating signals for a plurality of modules, one of which is illustrated at 16.

The messages from a source are transmitted to the input buffer 10 via a communication line 18. The input buffer provides for receiving and storing a complete message. The storage unit 11 provides for storing a plurality of messages. When the storage unit 11 is ready to receive another message for storage, a ready signal is transmitted to the input buffer and, if there is a message stored in the buffer, this message is transmitted to the storage unit 11. The output buffer 12 also provides for receiving and storing a complete message. When the output buffer is empty, a signal is provided to the storage unit 11 and a message is transferred from the storage unit 11 to the output buffer 12. The output buffer 12 has provision for transmitting a message therefrom at a lower rate and at a higher rate. Typically this could be a shift register with two different clock rates for shifting. The choice of output rate is made by the output rate control 13 which is responsive to signals received from the module selector and sequence controller.

The module selector 14, the sequence controller 15, and the module 16 may take the forms shown in the aforementioned applications Ser. Nos. 345,326, 346,229 and 219,260, respectively. When the module identification portion of a message (the first three characters of the seven-character message in the example given above) is transmitted to the module selector 14, and there is a module on the display board corresponding to this particular stock code, a control signal is provided from the module selector to the specific module. For the particular embodiment being described, the module selector would supply power to the module relay, for example to the module 16 on the $M_1$ line. At the same time, the module selector will provide a module selected signal to the output rate control 13. For example, the drawing of current for operation of the module relay may be utilized to provide the module selected signal. When the output rate control 13 receives the module selected signal, it functions to have the output buffer transmit the data portion of the message at the lower rate. This lower rate is selected to be one at which the module can be operated. In the embodiment illustrated, the data portion is transmitted to the sequence controller which in turn provides signals for actuating a row of the module and for actuating the columns of the module to change the setting thereof.

The next message is now transmitted into the output buffer 12 from the storage unit 11. The output rate from the output buffer 12 for the module identification portion of this next message preferably is maintained the same as it was for the data portion of the preceding message, although it could arbitrarily be switched to the lower or higher rate if desired, since the module selector can receive information at either rate. The module identification portion of the next message is transmitted to the module selector. If another module is selected, the lower transmission rate is continued as previously described. If there is no module on the display board for the next message, no module selected signal is generated, or conversely, a not-selected signal may be generated. The output rate control unit now functions to change the output rate of the buffer 12 to the higher rate so that the remaining portion of this message is transmitted from the buffer 12 at a fast rate. This data portion may be discarded or may be fed through the sequence controller 15 to provide synchronizing pulses where desired.

Another message is transferred from the storage unit 11 to the output buffer 12 and the module identification portion thereof is transmitted on to the module selector. If there is no module on the display board corresponding to this message, this message is also disposed of at the higher rate. Thus, it is seen that messages may be received on the communication line 18 at a first rate which is faster than the lower rate at which modules are actuated, while the unused messages are being discarded at a rate higher than that of the communication line. The relative magnitudes of the rates will be dependent upon the information content of the communication line and the number of modules on a display board. For most present-day installations, it has been found that the rate of transmission at the communication line may be twice that of the lower rate at which individual modules are actuated, with the higher discard rate being in the order of five times the lower actuation rate. In one specific embodiment, the utilization modules can change settings at a rate of 80 settings per minute, while messages are available from the source at a rate of 160 settings per minute. With the particular code utilized, this corresponds to a lower transmission rate from the output buffer 12 of 75 bits per second while the communication line 18 is providing information at 150 bits per second. The higher transmission rate from the output buffer is selected to provide for message handling at about five times the lower rate.

While conventional memory devices and comparators may be selected for the system, an advantage is achieved when the controller for the units or modules is utilized as the memory and comparator. When the controller is changed to direct a different message to a unit, as when a broker changes his board to display a different stock, the changing of the controller automatically changes the selection information. For example, in the module selector, as illustrated in copending application Ser. No. 345,326, the broker changes the identification of the stock being displayed by removing the group of slide tabs corresponding to the identification of the old stock and inserting a group of slide tabs corresponding to the identification of the new stock. By this one operation, a new identification is established for a module and for the memory or storage for comparison or analysis for the presence of this identification in the units being served by the system.

In one form of the module selector 14, relays are utilized in the module selection system and it is desired to provide time for relay operation, regardless of the transmission rate of the preceding message portion. Referring to the example again, the first three characters comprising the identification portion are transmitted to the module selector at either the higher or lower rate. During the period for the transmission of the next character, which would be the fourth character or step 4 of the message, the module selector relays are operated. Additional time for this operation can be obtained by always transmitting the fourth character of the message at the lower rate. This may be accomplished by providing a step 4 signal from the sequence controller 15 to the output rate control 13, so that the rate control always switches the transmission rate of the output buffer 12 to the lower rate for the fourth step.

The storage unit 11 may take a variety of forms and is designed to handle a plurality of messages, with the first message in from the input buffer 10 being the first message transmitted out to the output buffer 12, in order to maintain the sequence for the information. The storage unit may utilize magnetic cores, flip-flops, shift registers of various forms, tape loops, delay lines or the like, and may incorporate sequential handling, input and output address counters, and the like for maintaining the first in-first out characteristic. A preferred form for the storage unit is illustrated in FIG. 3.

The storage unit of FIG. 3 includes a delay line 30, typically an acoustic-type line, with a write-in unit 31 and a readout unit 32. The information stored in the delay line is continuously recirculated through a switch 33 and a switch 34. The messages from the input buffer 10 are written into the delay line in sequence. The delay line at any time will include a sequence of message characters or words and a sequence of words with no information or empty words. Each message character will include one or more bits indicating that it is a non-empty word.

A message arriving at the input buffer 10 is held until the last character of the sequence passes the switch 34. The arrival of the last character of the storage sequence, followed by the first empty word, is detected by a last character detect unit 35 which provides a signal to the switch 34 for switching the message from the buffer 10 into the message sequence of the storage unit. Each time the last character of the storage sequence passes the switch 34 and there is a message stored in the buffer 10, this message is inserted into the storage unit at the end of the sequence.

The arrival of the first character of the message sequence at the readout 32 is detected by a first character detect unit 36. When the output buffer 12 is empty awaiting another message, and the first character of the message sequence arrives at the readout unit 32, the switch 33 is actuated to direct this message to the output buffer 12. An empty word is inserted in the recirculating line in place of this outputted message. The message which previously was second in line in the recirculating sequence is now first and will be outputted the next time it passes the readout unit 32 and the output buffer 12 is empty.

The speed of the recirculating storage loop formed by the delay line and associated readout and write-in equipment should be such that the contents of the loop move past the input switch 34 in less time than is required to transmit a message on the communication line so that each message can be written into the storage unit from the input buffer before the next message is received. In the specific embodiment described, the storage loop provides for storage of 5600 bits and is operated at a bit rate of one megacycle per second and provides for storage of 110 messages or board settings.

I claim as my invention:

1. A system for handling security price information or the like between a source and a plurality of utilization units wherein the information comprises messages, each having a sequence of characters including an identification portion and a data portion, including in combination:

buffer storage means for storing a message and having means for transmitting the message from storage at a lower rate and at a higher rate;

comparator means for comparing the identification portion of a message with the identifications of the utilization units supplied by the system and generating a selection signal when coincidence exists; and control means having said selection signal as an input for actuating said buffer storage means to transmit the data portion of said message at said lower rate.

2. A system as defined in claim 1 in which said control means includes means for actuating said buffer storage means to transmit the data portion of said message at said higher rate when no unit corresponding to the identification portion of said message is being supplied by the system.

3. A system as defined in claim 1 in which said comparator means includes:

a controller for selecting a unit corresponding to the identification portion of a message, the data portion of which is in said buffer storage means; and signal means for generating a selection signal when a unit is selected.

4. A system as defined in claim 3 in which said control means includes means for actuating said buffer storage means to transmit the data portion of said message at said higher rate when no unit corresponding to the identification portion of said message is being supplied by the system and in which the data portion of a message and the identification portion of the next message are transmitted from said buffer storage means to said controller at the same rate.

5. A system as defined in claim 4 including additional signal means for generating a signal when the character of a message following the identification portion thereof is to be transmitted from storage, and with said control means having said character signal as an input for actuating said buffer storage means to transmit such character at said lower rate.

6. A system as defined in claim 1 including a second storage means for storing a plurality of messages received from a source and having means for transmitting the first message stored therein to said buffer storage means.

7. A system as defined in claim 1 including a second storage means for storing a plurality of messages in sequence as received from a source with the last message being added at the end of the sequence, and having means for transmitting the first message of the sequence to said buffer storage means.

8. A system as defined in claim 7 in which said second storage means includes:
   a continuously recirculating storage loop;
   first detector means for detecting the end of a sequence of messages in the loop;
   second detector means for detecting the start of a sequence of messages in the loop;
   third detector means for detecting when said buffer storage means is empty;
   means actuated by said first detector means for introducing another message from the source into the loop at the end of the sequence; and
   means actuated by said second and third detector means for transmitting the first message of the sequence to said buffer storage means when empty.

9. A system for handling security price information or the like between a source and a plurality of utilization units wherein the information comprises messages, each having a sequence of characters including a module identification portion and a data portion, including in combination:
   means for receiving a message at a first rate and storing said message;
   means for analyzing said message to determine if the identification portion thereof corresponds to that of one of the plurality of utilization units; and
   means for transmitting the data portion of said message from storage at a second lower rate when there is correspondence and at a third higher rate when there is not correspondence.

10. A system as defined in claim 9 wherein said means for receiving and storing includes:
    first means for storing a plurality of messages in a sequence;
    second means for introducing additional messages as received from the source into said first means at the end of said sequence; and
    third means for extracting from said first means for analysis the message at the front of said sequence.

11. A system as defined in claim 9 including:
    means for storing the identification of each of the utilization units;
    means for comparing two identifications and providing an output to said means for transmitting indicating correspondence and no correspondence; and
    means for connecting the identification portion of a message and said means for storing as inputs to said means for comparing.

References Cited

UNITED STATES PATENTS

| | | | |
|---|---|---|---|
| 3,004,242 | 10/1961 | Honeiser | 340—172.5 |
| 3,253,263 | 5/1966 | Lee et al. | 340—152 X |
| 3,387,268 | 6/1968 | Epstein | 340—152 |

JOHN W. CALDWELL, Primary Examiner

HAROLD I. PITTS, Assistant Examiner

U.S. Cl. X.R.

340—152, 149, 167, 151, 163